United States Patent
Tsunoda

(10) Patent No.: US 7,202,621 B2
(45) Date of Patent: Apr. 10, 2007

(54) POWER STEERING CONTROL DEVICE FOR MONITORING REFERENCE VOLTAGE

(75) Inventor: Mikihiko Tsunoda, Maebashi (JP)

(73) Assignees: NSK Ltd., Tokyo (JP); NSK Steering Systems Co., Ltd., Tokyo (JP)

( * ) Notice: Subject to any disclaimer, the term of this patent is extended or adjusted under 35 U.S.C. 154(b) by 0 days.

(21) Appl. No.: 11/126,303

(22) Filed: May 11, 2005

(65) Prior Publication Data

US 2005/0264248 A1    Dec. 1, 2005

(30) Foreign Application Priority Data

May 13, 2004    (JP)    ............................. 2004-143231

(51) Int. Cl.
*H02P 7/00*    (2006.01)

(52) U.S. Cl. ...................... 318/434; 318/432

(58) Field of Classification Search ...................... None
See application file for complete search history.

(56) References Cited

U.S. PATENT DOCUMENTS

| | | | |
|---|---|---|---|
| 4,660,671 A | 4/1987 | Behr et al. | 180/142 |
| 5,259,473 A * | 11/1993 | Nishimoto | 180/446 |
| 5,663,713 A * | 9/1997 | Ironside et al. | 340/661 |
| 6,397,969 B1 * | 6/2002 | Kasai et al. | 180/404 |

FOREIGN PATENT DOCUMENTS

| | | |
|---|---|---|
| EP | 0 638 470 | 9/1992 |
| EP | 0 701 207 | 3/1996 |
| JP | 2001-88728 | 4/2001 |

* cited by examiner

*Primary Examiner*—Lincoln Donovan
*Assistant Examiner*—Renata McCloud
(74) *Attorney, Agent, or Firm*—Miles & Stockbridge P.C.

(57) ABSTRACT

A power steering control device includes a torque sensor that detects a steering torque and outputs a torque signal having a torque neutral voltage is determined based on a predetermined reference voltage, a reference-voltage generator unit that generates the reference voltage, an A/D converter unit that A/D converts the torque signal and the reference voltage, a calculator unit that calculates a steering assist torque based on the A/D converted torque signal, a current controller unit that supplies a driving current in accordance with the assist torque to a steering assist motor, a reference-voltage generator unit that generates the reference voltage and outputs the reference voltage to the A/D converter unit and a fault diagnosis unit that monitors the A/D converted reference voltage and performs a predetermined fault diagnosis process.

12 Claims, 9 Drawing Sheets

POWER STEERING CONTROL DEVICE FOR MONITORING REFERENCE VOLTAGE

BACKGROUND OF THE INVENTION

1. Field of the Invention

The present invention relates to a power steering control device, a method therefor, and a program therefor, and particularly to a power steering control device capable of detecting an abnormality of a reference voltage of an electric power steering control unit, a method therefor, and a program therefor.

2. Related Background Art

An electric power steering device using a torque of an electric motor has been utilized as an assist steering device for an automobile. The power steering device is constituted to have: a torque sensor that detects a steering wheel operation by a driver and automotive movement; an electric power steering control unit (ECU) that calculates an assist steering force in accordance with a detection signal from the torque sensor; an electric motor that generates a rotating torque in accordance with an output signal from the ECU; a reduction gear that transmits the rotating torque to a steering mechanism; and the like.

In the power steering device as constituted above, when the driver steers a steering, a torque is applied to the torque sensor, and then, a torque signal in correspondence with the torque strength is output to an A/D converter in the ECU. The ECU calculates a steering assist torque in accordance with the A/D converted torque signal, and the steering assist torque is given to the steering by means of the electric motor.

The above-mentioned torque sensor has two output signals, that is, a main torque signal and a sub torque signal, and is set to exhibit a cross characteristic in which the total voltage of those signals is a constant voltage (for example, 5 V). That is, in the case where the torque is not applied to the steering, the main torque signal and the sub torque signal each have a torque neutral voltage of 2.5 V; on the other hand, in the case where any torque is applied to the steering, the main torque signal and the sub torque signal fluctuate in opposite directions with the torque neutral voltage of 2.5 V as a reference.

Further, a reference-voltage generator circuit for the torque sensor is provided in the ECU so as to detect the torque neutral voltage with accuracy. In general, a power supply voltage for driving the torque sensor is easy to fluctuate due to other electric circuits mounted in a car and environmental variation such as temperature variation. Moreover, the A/D converter has a predetermined detection voltage error. Thus, even if the torque neutral voltage of 2.5 V is precisely input to the A/D converter from the torque sensor, the ECU performs misdetection of the torque.

From the above reasons, the reference-voltage generator circuit for the torque sensor is provided, and also, a reference voltage from the reference-voltage generator circuit is used as a reference voltage of the A/D converter. Accordingly, the conversion error of the torque neutral voltage in the A/D converter is eliminated. Further, the same reference voltage is given to the torque sensor and the A/D converter. As a result, even if the reference voltage in the reference-voltage generator circuit slightly fluctuates, the A/D converted neutral voltage is difficult to fluctuate.

Further, the total voltage of the main torque signal and the sub torque signal from the torque sensor is the constant voltage of 5 V. Thus, monitoring the voltage enables detection of an abnormality of the torque sensor.

However, in the above-described device, although the reference voltage from the reference-voltage generator circuit is used as the reference voltage for A/D conversion, monitoring the reference voltage itself is not performed. Therefore, it has been such that an abnormality of the reference-voltage generator circuit cannot be detected even if the reference voltage largely fluctuates due to the abnormality of the reference-voltage generator circuit. Further, monitoring the reference voltage from the torque sensor is also used for detection of other fault modes in many cases, and thus, a normal value of the reference voltage needs to be set in a wide range. Therefore, even if the abnormality occurs in the reference-voltage generator circuit, it may be judged that the reference voltage is in a normal range. For example, in the case where the reference voltage of the torque sensor is close to a limitation on the normal value, there may be a difference between right and left toward steering forces detected by the torque sensor.

Note that a reference-voltage generator circuit for a torque sensor is disclosed as a conventional power steering control device in JP 2001-088728 A. The reference-voltage generator circuit is used not only for a reference of a torque neutral voltage of the torque sensor but also for a reference voltage of an A/D converter in an ECU. However, monitoring a reference voltage of the reference-voltage generator circuit is not performed. Therefore, it has been difficult to perform a fail safe process in accordance with a state of the reference-voltage generator circuit.

SUMMARY OF THE INVENTION

The present invention has been made in view of the above-mentioned problem, and therefore has an object to monitor a reference voltage from a reference-voltage generator circuit to thereby perform a fail safe process in accordance with a state of a reference-voltage generator circuit and adjust a torque neutral voltage of a torque sensor correctly.

In order to attain the above mentioned object, the present invention provides a power steering control device, including: a torque sensor that detects a steering torque and outputs a torque signal having a torque neutral voltage determined in accordance with a predetermined reference voltage; a reference-voltage generator unit that generates the reference voltage; an A/D converter unit that A/D converts the torque signal and the reference voltage; a calculator unit that calculates a steering assist torque in accordance with the A/D converted torque signal; a current controller unit that supplies a driving current in accordance with the assist torque to a steering assist motor; and a fault diagnosis unit that monitors the A/D converted reference voltage and performs a predetermined fault diagnosis process.

Also, the power steering control device further includes a neutral adjustor unit that adjusts the neutral voltage of the torque signal in accordance with fluctuation in the reference voltage.

In the power steering control device, the fault diagnosis unit gives a command to prohibit generation of the steering assist torque to the calculator unit when the reference voltage is out of a predetermined threshold range.

Further, in the power steering control device, the fault diagnosis unit gives a command to continue generation of the steering assist torque to the calculator unit when the reference voltage fluctuates in proportion to the torque neutral voltage of the torque sensor.

Further, in the power steering control device, the fault diagnosis unit gives to the calculator unit a command to change an upper limit value of the steering assist torque in accordance with a fluctuation amount of the reference voltage.

According to the present invention, the fault diagnosis unit monitors not only the torque signal but also the reference voltage, whereby an abnormality of the reference-voltage generator unit can be detected. Thus, a fail safe function can be realized in accordance with a state of the reference-voltage generator unit. For example, in the case where the reference voltage is out of the predetermined threshold range, the generation of the steering assist torque can be prohibited. Further, in the case where the reference voltage has fluctuated in proportion to the torque neutral voltage of the torque sensor, it is considered that the torque sensor operates normally. Therefore, in this case, the command to continue the generation of the steering assist torque is given to the calculator unit, thereby being capable of continuing the generation of the steering assist torque.

Moreover, according to the present invention, in the case where the reference voltage has fluctuated, the upper limit of the steering assist torque is modified. As a result, a more natural fail safe process can be performed. That is, in the case where the reference voltage has fluctuated, it is considered that the voltage in the vicinity of the maximum value of the torque signal is inaccurate. Thus, the maximum value of the steering assist torque is changed in accordance with the fluctuation amount of the reference voltage, whereby misoperation of the power steering device in the vicinity of the maximum value of the torque signal can be avoided.

Furthermore, according to the present invention, monitoring the reference voltage enables adjustment of the torque neutral voltage of the sensor signal. That is, the torque neutral voltage is determined in accordance with the reference voltage. Therefore, even if the reference voltage has fluctuated, the torque neutral voltage can be grasped with accuracy.

DESCRIPTION OF THE PREFERRED EMBODIMENTS

Hereinafter, description will be made of the best embodiment of the present invention with reference to the accompanying drawings.

Figure 1:
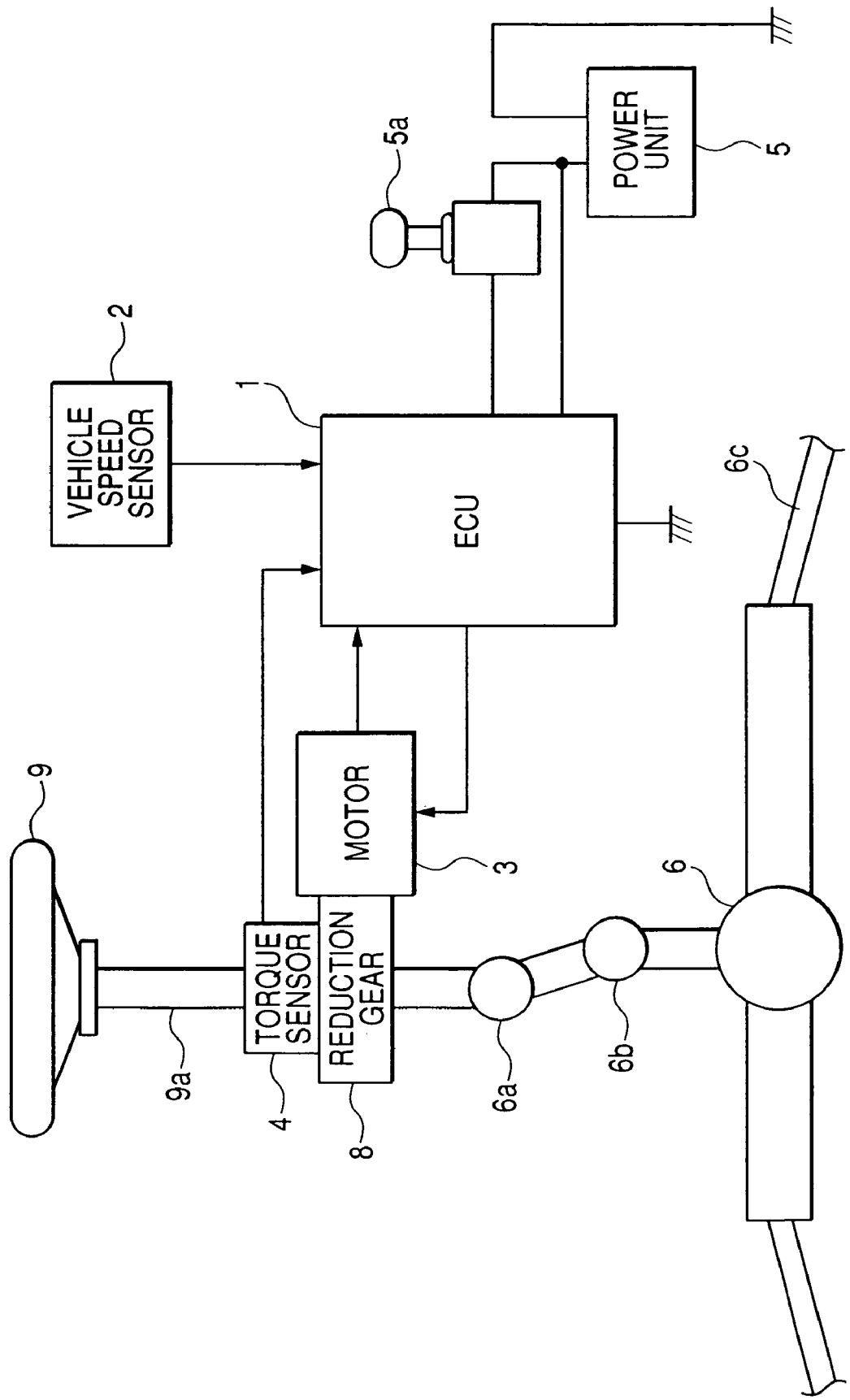
FIG. 1 is a schematic diagram of a power steering device in accordance with an embodiment of the present invention.

FIG. 1 is a schematic diagram of an electric power steering device according to the present invention. In this figure, an end portion of a shaft 9a of a steering wheel 9 is coupled to a rack & pinion 6 through universal joints 6a and 6b. Further, the rack & pinion 6 is provided with a steering tie rod 6c of a wheel, and rotational motion of the steering wheel 9 is converted into motion in a shaft direction of the steering tie rod 6c.

The shaft 9a of the steering wheel 9 is provided with a torque sensor 4, and the torque sensor 4 outputs a steering torque of the steering wheel 9 as an electric signal. Further, the shaft 9a is attached with a reduction gear 8 and a motor 3, and a rotating torque of the motor 3 is transmitted to the shaft 9a through the reduction gear 8.

An ECU 1 calculates an assist steering torque in accordance with a detection signal from the torque sensor 4 and a vehicle speed signal from a vehicle speed sensor 2 as described above, and transmits a driving signal based on the calculation result to the motor 3. A power unit 5 is connected to the ECU 1, and, when turning the ignition key 5a on, a relay in the ECU 1 turns on so that a current is supplied to the ECU 1.

Figure 2:
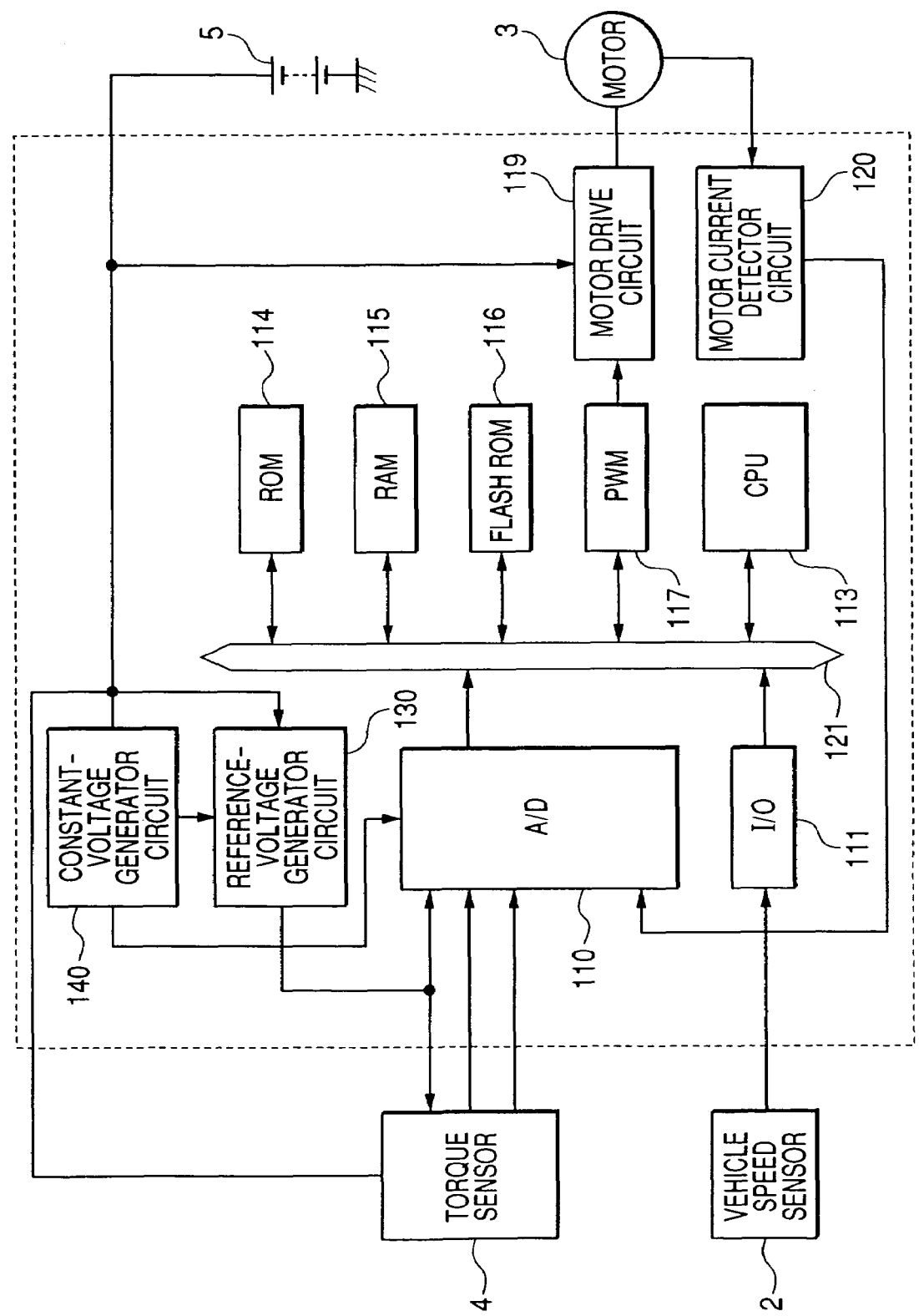
FIG. 2 is a block diagram of a power steering control device in accordance with the embodiment of the present invention.

FIG. 2 is a block diagram showing a hardware structure of the ECU 1. The ECU 1 is constituted to have an A/D converter 110, I/O interface 111, timer 112, CPU 113, ROM 114, RAM 115, flash ROM 116, PWM controller 117, motor drive circuit 119, motor current detector circuit 120, bus 121, reference-voltage generator circuit 130, and constant-voltage generator circuit 140.

The A/D converter 110 converts a main torque signal and a sub torque signal, which are output from the torque sensor 4, and a reference voltage from the reference-voltage generator circuit 130 into digital signals. The I/O interface 111 counts vehicle speed pulses from the vehicle speed sensor 2 and converts them into digital signals.

The ROM 114 is used as a memory for storing a control program of the motor 3 and a program of a fail safe function, and the RAM 115 is used as a work memory for executing the programs. The flash ROM 116 is a memory which is capable of holding storage contents even after power unit shutdown, and can record fault diagnosis results and the like.

The PWM controller 117 is intended for converting a signal representing a torque of the motor 3 into a signal, which has been subjected to pulse width modulation. The motor drive circuit 119 is composed of an inverter circuit, and is intended for generating a driving power in accordance with a produced output signal from the PWM controller 117. The motor current detector circuit 120 is intended for detecting a counter electromotive voltage generated in the motor 3, and the counter electromotive voltage is converted into a digital signal by means of the A/D converter 110, and then, is transmitted to the CPU 113.

The reference-voltage generator circuit 130 is constituted by an operational amplifier and the like, and is intended for generating a reference voltage of, for example, 3.3 V through dropping a voltage of the power unit 5. The reference voltage is supplied to the torque sensor 4, and is used for generating a torque neutral voltage of 2.5 V. Further, the reference voltage is supplied to an analog input of the A/D converter 110 to be convert to A/D conversion, and thereafter, the CPU 113 judges whether there is an abnormal voltage or not. The constant-voltage generator circuit 140 is constituted by a regulator circuit and the like, and functions as a power supply circuit for operating the A/D converter 110, the CPU 113 and the like.

Figure 3:
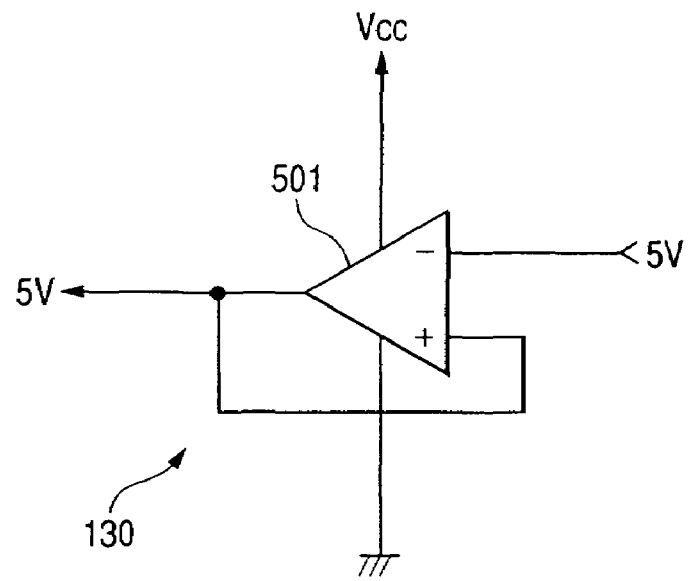
FIG. 3 is a diagram showing an example of a reference-voltage generator circuit in accordance with the embodiment of the present invention.
Figure 4:
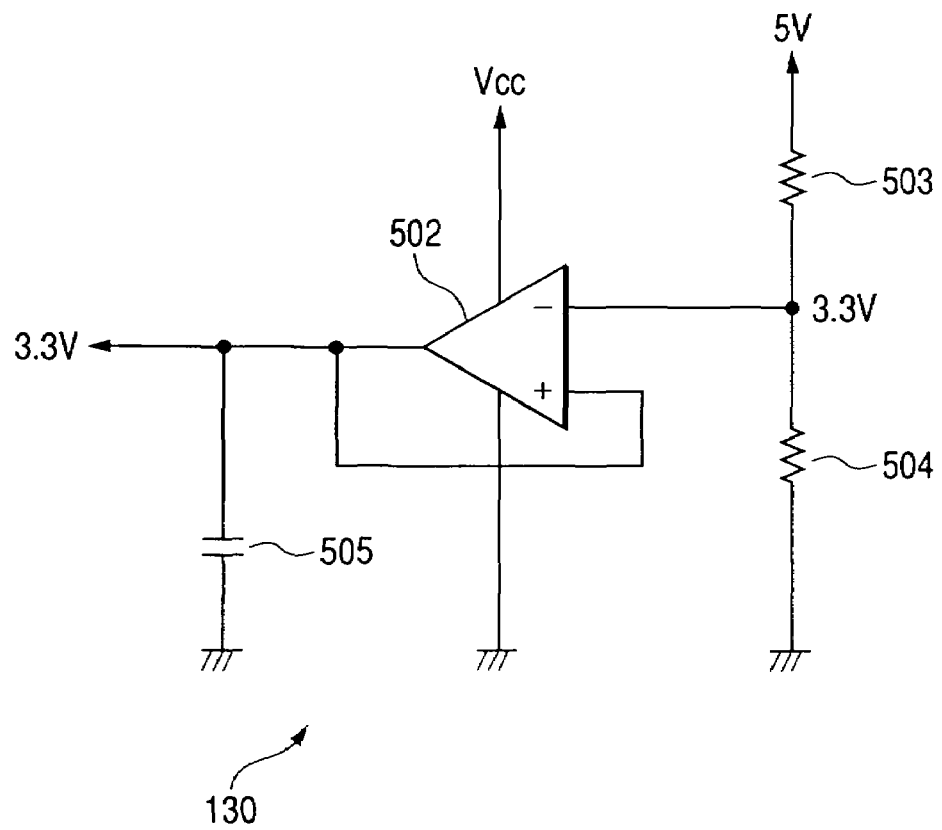
FIG. 4 is a diagram showing an example of the reference-voltage generator circuit in accordance with the embodiment of the present invention.

FIGS. 3 and 4 each show an example of the reference-voltage generator circuit 130. The reference-voltage generator circuit 130 shown in FIG. 3 is provided with an operational amplifier 501 that functions as a voltage follower. A constant voltage of 5 V is applied from the constant-voltage circuit 140 to a negative input terminal of the operational amplifier 501, and a current-amplified reference voltage of 5 V can be output from an output terminal. The reference-voltage generator circuit 130 shown in FIG. 4 can output a reference voltage of 3.3 V. That is, a voltage of 3.3 V which has been divided by the constant voltage of 5 v is applied by resistors 503 and 504 to a negative input terminal of an operational amplifier 502 that functions as a voltage follower, and a current-amplified reference voltage of 3.3 V is output from an output terminal of the operational amplifier 502. Moreover, the output terminal of the operational amplifier 502 may be provided with a smoothing capacitor 505. As described above, the reference voltage from the reference-voltage generator circuit 130 is supplied to the torque sensor 4 and the A/D converter 110.

Figure 5:
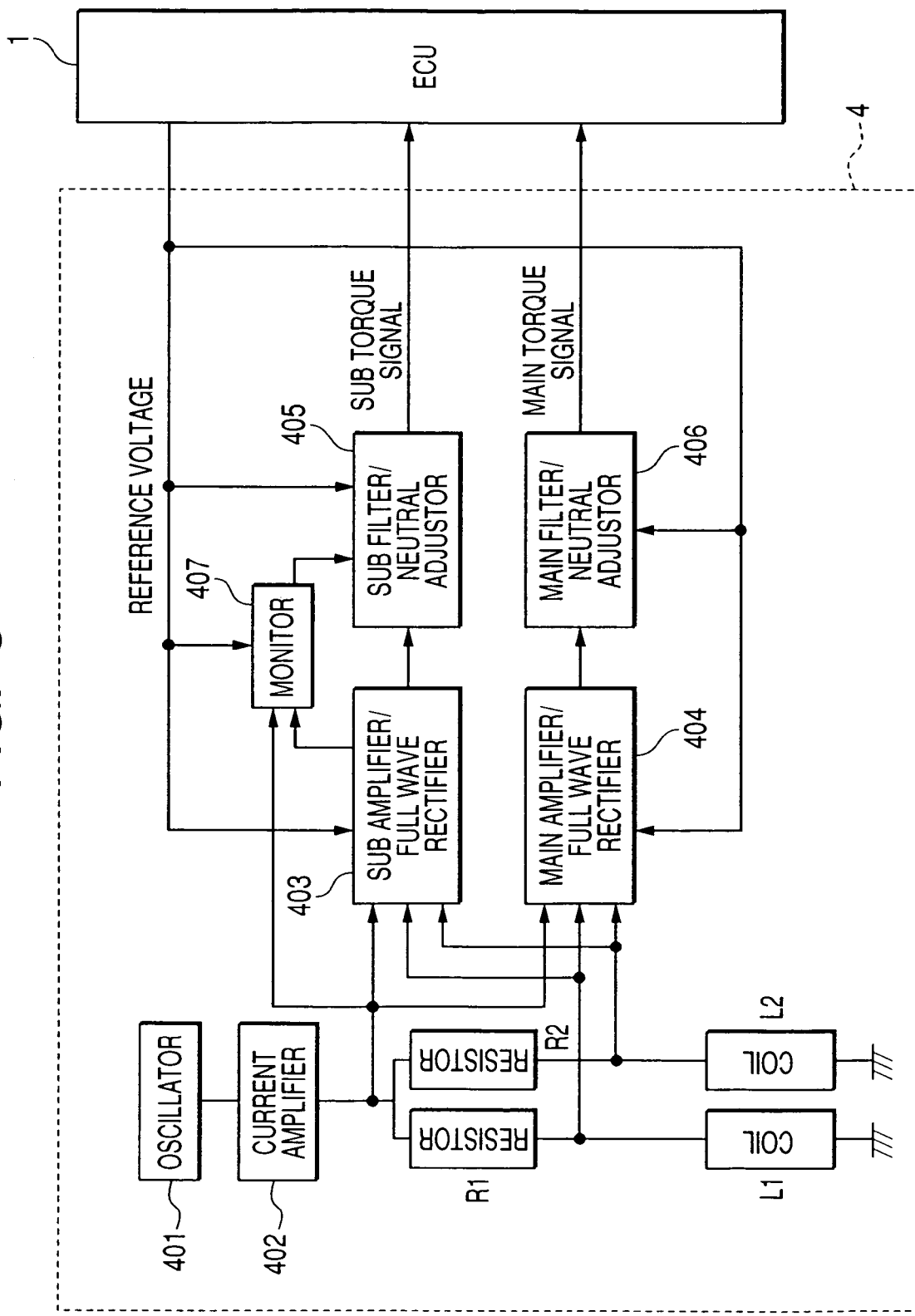
FIG. 5 is a block diagram of a torque sensor in accordance with the embodiment of the present invention.

FIG. 5 is a block diagram of the torque sensor 4. The torque sensor 4 is a so-called non-contact type torque sensor, and detects inductance change affected by a torque and can output the main torque signal and the sub torque signal. The torque sensor 4 is constituted to have an oscillator 401, current amplifier 402, resistors R1 and R2, coils L1 and L2, sub amplifier/full wave rectifier 403, main amplifier/full wave rectifier 404, sub filter/neutral adjuster 405, main filter/neutral adjuster 406, and monitor 407.

The oscillator 401 is composed of a ceramic oscillator, quartz oscillator, or an oscillation circuit with an LC circuit and the like, and is intended for generating an alternating current signal of a predetermined frequency. The current amplifier 402 is composed of a current amplifier circuit constituted by a transistor and the like, and performs current amplification of the alternating current signal generated by the oscillator 401, thereby generating a current necessary for driving the resistors R1 and R2 and the coils L1 and L2.

Figure 7:
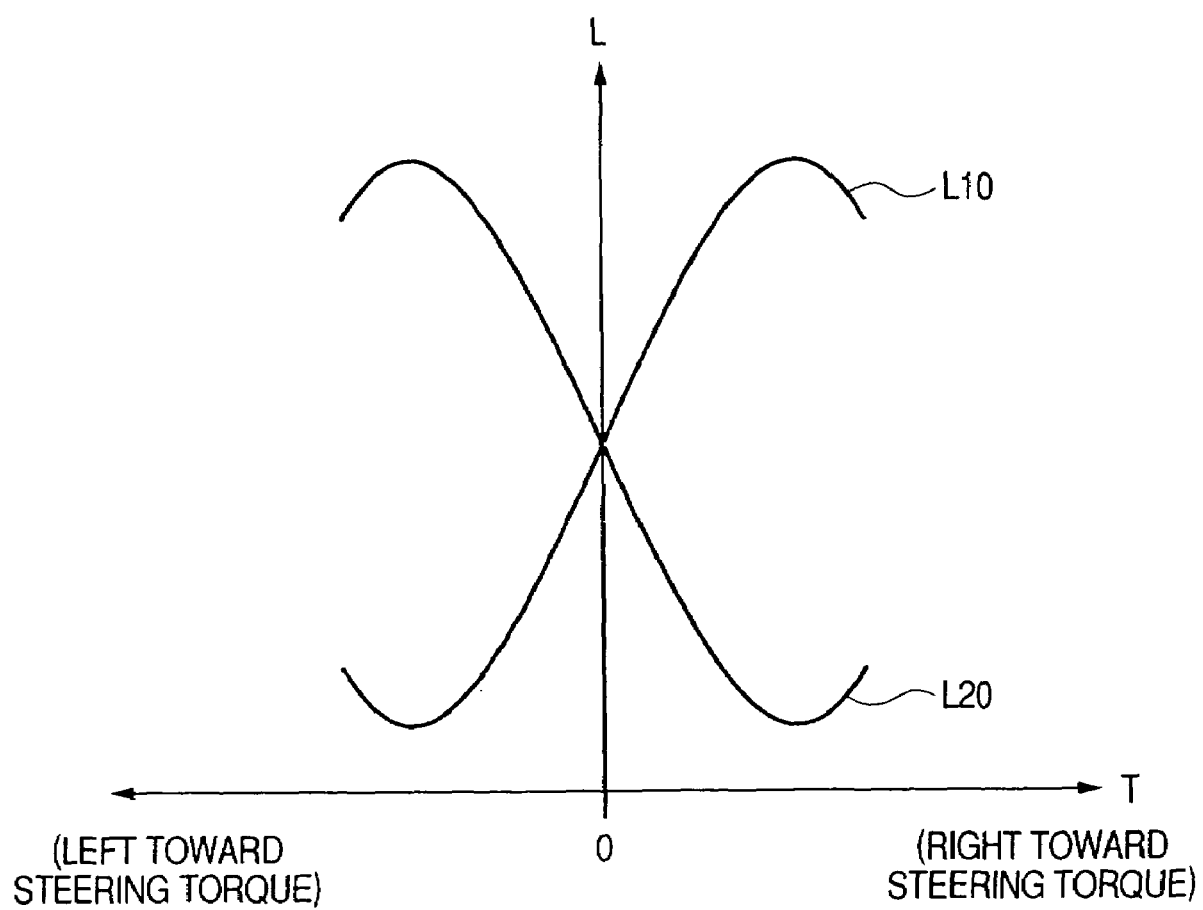
FIG. 7 is a graph showing characteristics of the torque sensor in accordance with the embodiment of the present invention.

The coils L1 and L2 are arranged at one of input/output shafts, and a metal cylinder is arranged at the other shaft. Further, double windows are arranged at positions opposing the coils L1 and L2 on the metal cylinder. The double windows are formed to be shifted by a half pitch from each other. According to torsion of the shaft, it is generated magnetic flux changes with opposite phases in the two coils L1 and L2 for each other. That is, as shown in FIG. 7, if a right toward steering torque is applied to the torque sensor 4, an inductance L10 of the coil L1 increases while an inductance L20 of the coil L2 decreases. Further, if a left toward steering torque is applied to the torque sensor 4, the inductance L10 of the coil L1 decreases while the inductance L20 of the coil L2 increases. As described above, the respective inductances in the coils L1 and L2 change in the opposite directions against the torque.

The sub amplifier/full wave rectifier 403 and the main amplifier/full wave rectifier 404 are constituted by a differential amplifier, a rectification circuit and the like, and have a function of amplifying differential of inductance changes in the coils L1 and L2 and also removing an alternating component. The sub filter/neutral adjustor 405 and the main filter/neutral adjustor 406 are intended for setting the respective voltages of the sub torque signal and the main torque signal in accordance with the reference voltage which is supplied from the ECU 1. That is, the voltages of the main torque signal and the sub torque signal are adjusted with the reference voltage of 3.3 V as a reference, and the respective torque neutral voltages are set at 2.5 V. The monitor 407 has a function of monitoring an abnormality of the oscillator 401, breaks of the coils L1 and L2 and the like. If the monitor 407 detects the abnormality, for example, one of the voltages of the main torque signal and the sub torque signal is forcedly set to an abnormal value. Accordingly, the ECU 1 can detect an abnormality of the torque sensor 4.

Figure 6:
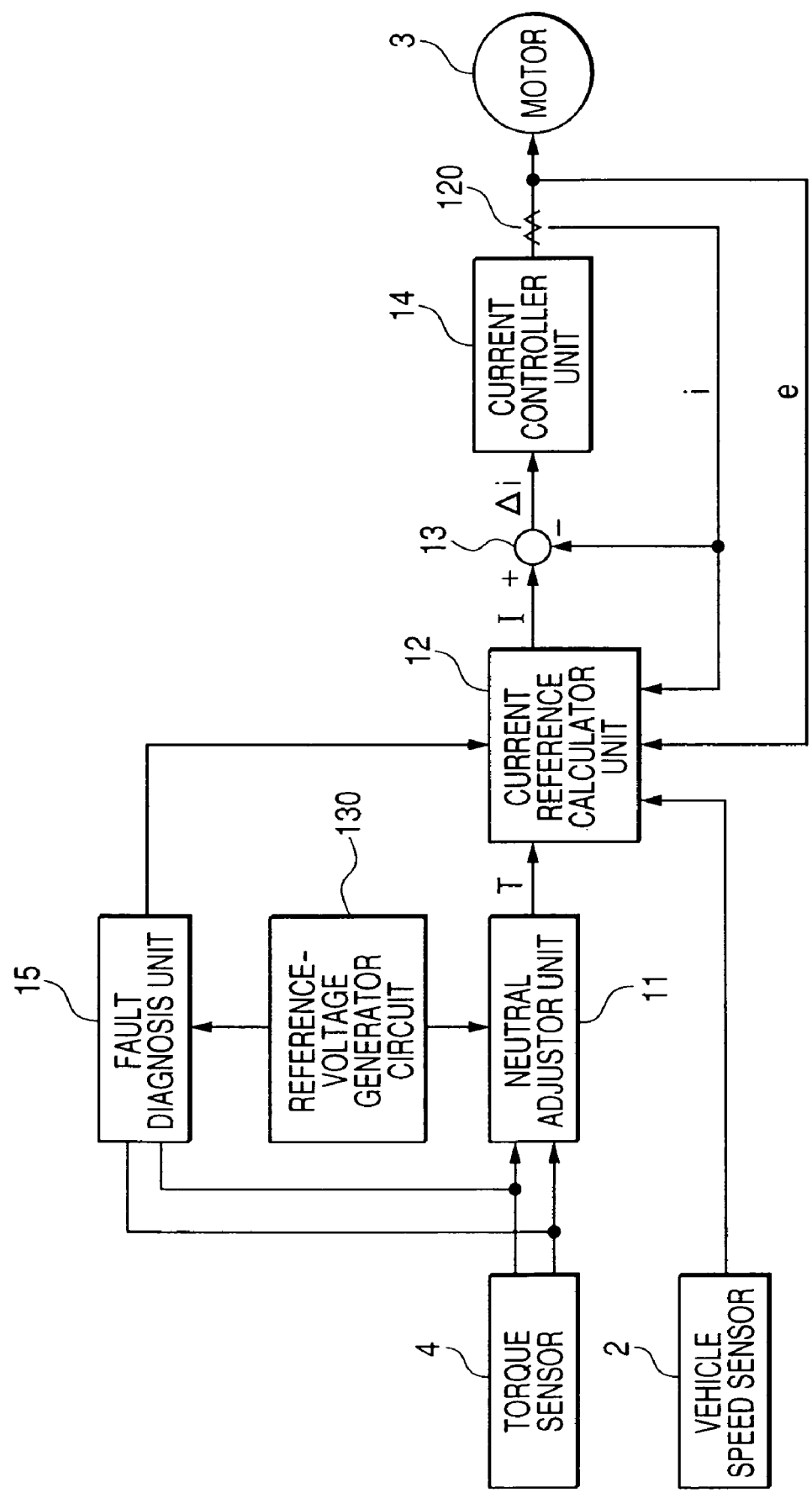
FIG. 6 is a block diagram showing functions of an ECU in accordance with the embodiment of the present invention.

FIG. 6 is a functional block diagram of the ECU 1. In this figure, a neutral adjustor unit 11, current reference calculator unit 12, current controller unit 14, and fault diagnosis unit 15 are made to function by the CPU 113 in the ECU 1.

The main torque signal and the sub torque signal from the torque sensor 4 and the reference voltage from the reference-voltage generator circuit 130 are input to the neutral adjustor unit 11. That is, the main torque signal, sub torque signal and reference voltage are subjected to A/D conversion by the A/D converter 110, and then, the converted signals are input to the CPU 113. The neutral adjustor unit 11 can adjust the respective torque neutral voltages of the main torque signal and the sub torque signal in accordance with the reference voltage of 3.3 V. For example, even if the torque neutral voltage has fluctuated due to the abnormality of the torque sensor 4, the adjustment of the torque neutral voltage can be performed by the neutral adjustor unit 11. A torque signal T which has been adjusted to the torque neutral voltage in the neutral adjustor unit 11 is input to the current reference calculator unit 12.

The current reference calculator unit 12 has a function of calculating a current reference I in accordance with the torque signal T, vehicle speed signal, and detection current i and detection voltage e of the motor. The current reference I indicates a driving current value is supplied to the motor 3, and control is performed such that a driving current equivalent to the current reference I is supplied to the motor 3. Further, the current reference calculator unit 12 is input with the vehicle speed pulse from the vehicle speed sensor 2, and can determine the steering assist force in accordance with a vehicle speed.

Moreover, the current reference calculator unit 12 makes steering wheel return compensation and motor maximum current control. For example, in the steering wheel return compensation, control is performed such that the steering wheel 9 is returned to a neutral position. In general, in the electric power steering device, a self-aligning torque is apt to weaken due to the influence of the reduction gear 8 and the like, for the reason, the steering wheel is difficult to be returned to the neutral position. Therefore, the voltage e across terminals of the motor and the motor current i are detected when the motor 3 is rotated with the action of the self-aligning torque, which detects motor angular speed. And then, a compensation current value is calculated to return the steering wheel to the neutral position.

The motor current detector circuit 120 detects the current supplied to the motor 3, and outputs a signal of the detection current i. The detection current i is fed back to an adder 13, and also, is input to the current reference calculator unit 12. The adder 13 calculates a deviation Δi between the detection current i and the current reference I, and outputs the deviation Δi to the current controller unit 14.

The current controller unit 14 is constituted by a differential calculator, proportional calculator and integral calculator, and has a function to control the deviation Δi becomes zero. The differential calculator is provided to improve a response speed of the control, and the proportional calculator is intended for multiplying the deviation Δi by a predetermined proportional coefficient. Further, the integral calculator counts an integral value with a time base of the deviation Δi, and makes control such that a steady-state value of the deviation Δi becomes zero.

The fault diagnosis unit 15 monitors the voltage values of the reference voltage, main torque signal and sub torque signal thereby performing a fail safe process. That is, when each of the main torque signal and the sub torque signal is out of the range of a predetermined threshold, it is judged that there is an abnormality of the torque sensor 4. Then, a command of an assist prohibition is given to the current reference calculator unit 12. Further, when the reference voltage is out of the predetermined threshold range, it is judged that there is an abnormality of the reference-voltage generator unit 130. Then, a command of assist limitation or a command of the assist prohibition or the like is given to the current reference calculator unit 12. The current reference calculator unit 12 can perform a predetermined fail safe process in accordance with the given command. As described above, in this embodiment, not only monitoring the torque signal but also the reference voltage enables performing the fail safe process in accordance with the states of the torque sensor 4 and the reference-voltage generator unit 130.

For example, if the reference voltage has fluctuated within the threshold range, it is considered that the torque sensor also operates normally. Thus, the steering assist can be continued. However, in this case, the voltage in the vicinity of the maximum value of the torque signal tends to hold an inaccurate value, and there is a fear that misoperation of the steering assist occurs. In view of the above, this problem can be avoided by performing the fail safe process to suppress an upper limit value of the steering assist torque in accordance with a fluctuation amount of the reference voltage.

Subsequently, description will be made of an operation of an electric power steering control device in accordance with this embodiment with reference to flow charts in FIGS. 8 and 9.

<Overall Process>

Figure 8:
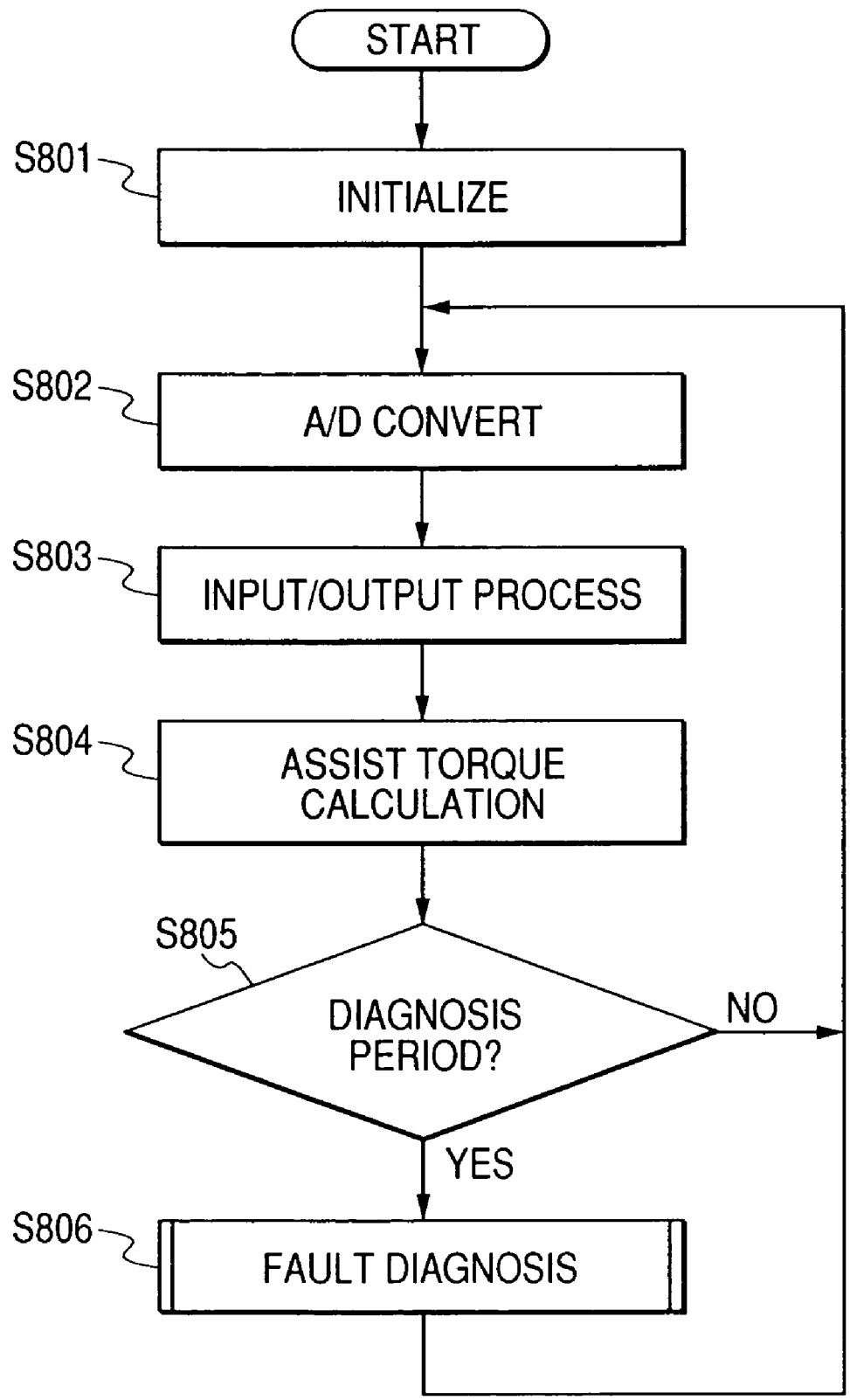
FIG. 8 is a flow chart showing an operation of the power steering control device in accordance with the embodiment of the present invention.

FIG. 8 is a flow chart showing an overall process of the electric power steering control device. First, the CPU 113 sets flags, variables and the like on the RAM 115 to initial values (step S801), and obtains A/D converted signals which are the main torque signal, sub torque signal, reference voltage and the like (step S802). Further, the CPU 113 is input with a signal and the like from the vehicle speed sensor 2, and also outputs a predetermined electric power to the motor 3 (step S803). The CPU 113 performs a calculating process of an assist torque in accordance with the input torque signal and the like (step S805). After diagnosis period elapse (YES in the step S805), the CPU 113 performs a fault diagnosis process (step S806). That is, the CPU 113 performs the fault diagnosis process every predetermined diagnosis period while repeating the above-described steps S801 to S806.

<Diagnosis Process>

Figure 9:
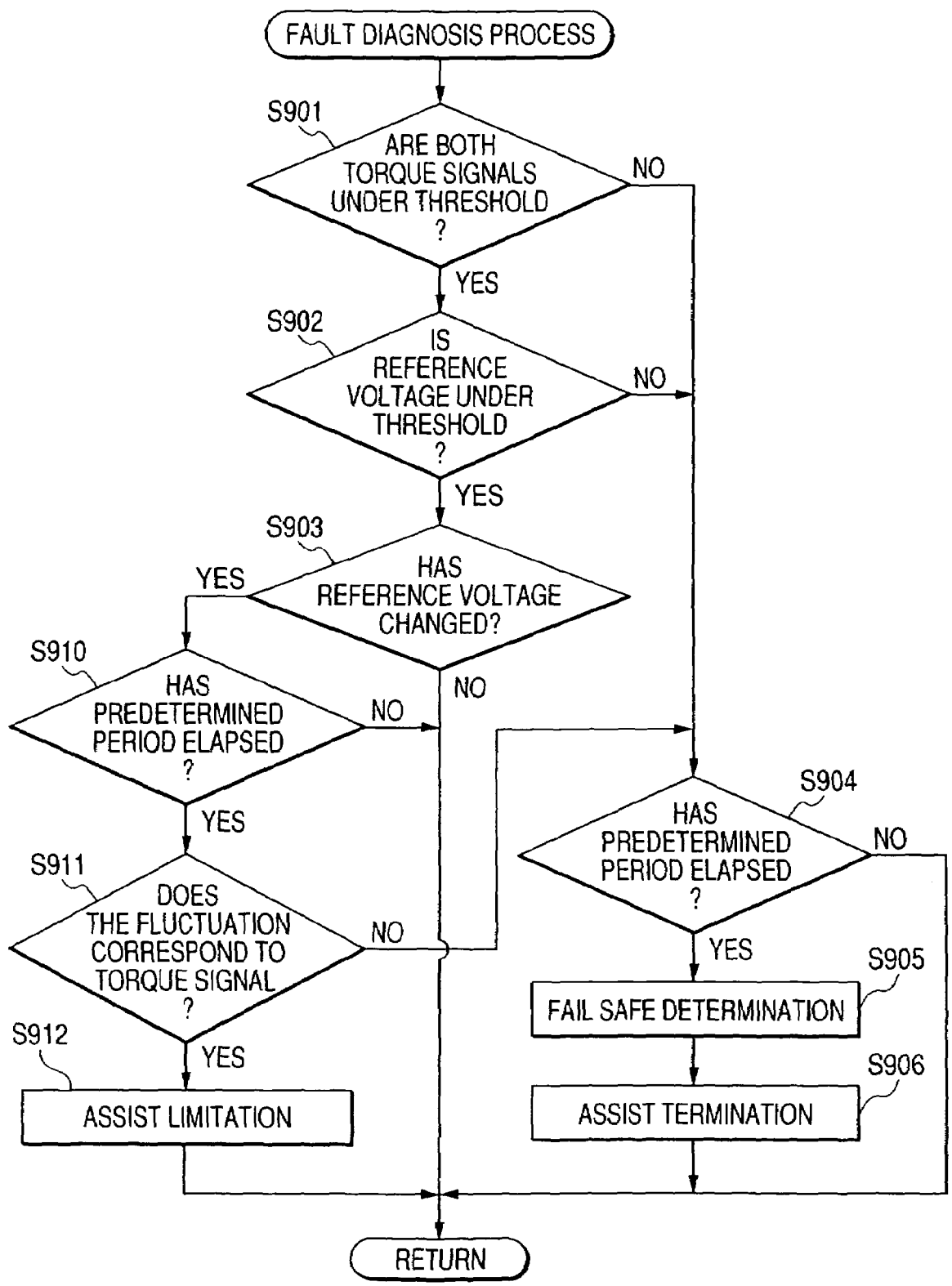
FIG. 9 is a flow chart showing a fault diagnosis process of the power steering control device in accordance with the embodiment of the present invention.

FIG. 9 is a flow chart showing the details of the fault diagnosis process shown in the step S806 as above. First, the CPU 113 judges whether each the main torque-signal and the sub torque signal falls within the normal threshold range (step S901). If these torque signals are out of the threshold range (NO in the step S901), the CPU 113 performs the process after step S904. In the step S904, the CPU 113 further judges whether an abnormality of the torque signal is continuously detected for a predetermined time. As in the above, monitoring the abnormality of the torque signal for the predetermined time (for example, 500 msec) can avoid misdetection due to the influence of noise and the like. If the abnormal value of the torque signal is continuously detected for a predetermined time (YES in the step S904), the CPU 113 determines that the torque sensor 4 has a fault (step S905), and terminates the assist for the electric power steering device (step S906).

On the other hand, if each the main torque signal and the sub torque signal has a normal value in the step S901 (YES in the step S901), the CPU 113 judges whether the reference voltage output from the reference-voltage generator circuit 130 is in the predetermined threshold range or not (step S902). For example, a threshold of a reference voltage Vref is defined by the following expression.

$$Vcc \times 3.3 - 1 < Vref < Vcc \times 3.3 + 1$$

If the reference voltage does not satisfy the expression (NO in the step S902), it is considered that the fault abnormality has occurred in the reference-voltage generator circuit 130. Then, the CPU 113 executes the process at the step S904 and the subsequent processes to perform a process of terminating the assist for the electric power steering device.

Even if the reference voltage satisfies the threshold (YES in the step S902), the reference voltage may fluctuate within the threshold range. Thus, the CPU 113 judges whether the reference voltage has fluctuated within the threshold range (step S903) or not. If the reference voltage has fluctuated within the above-mentioned threshold range (YES in the step S903), it is considered that any abnormality occurs in the reference-voltage generator circuit 130. If the reference voltage continuously fluctuation for a predetermined time (YES in step S910), the CPU 113 judges whether the torque signal has fluctuated at the same rate as the sensor signal (step S911).

Figure 10:
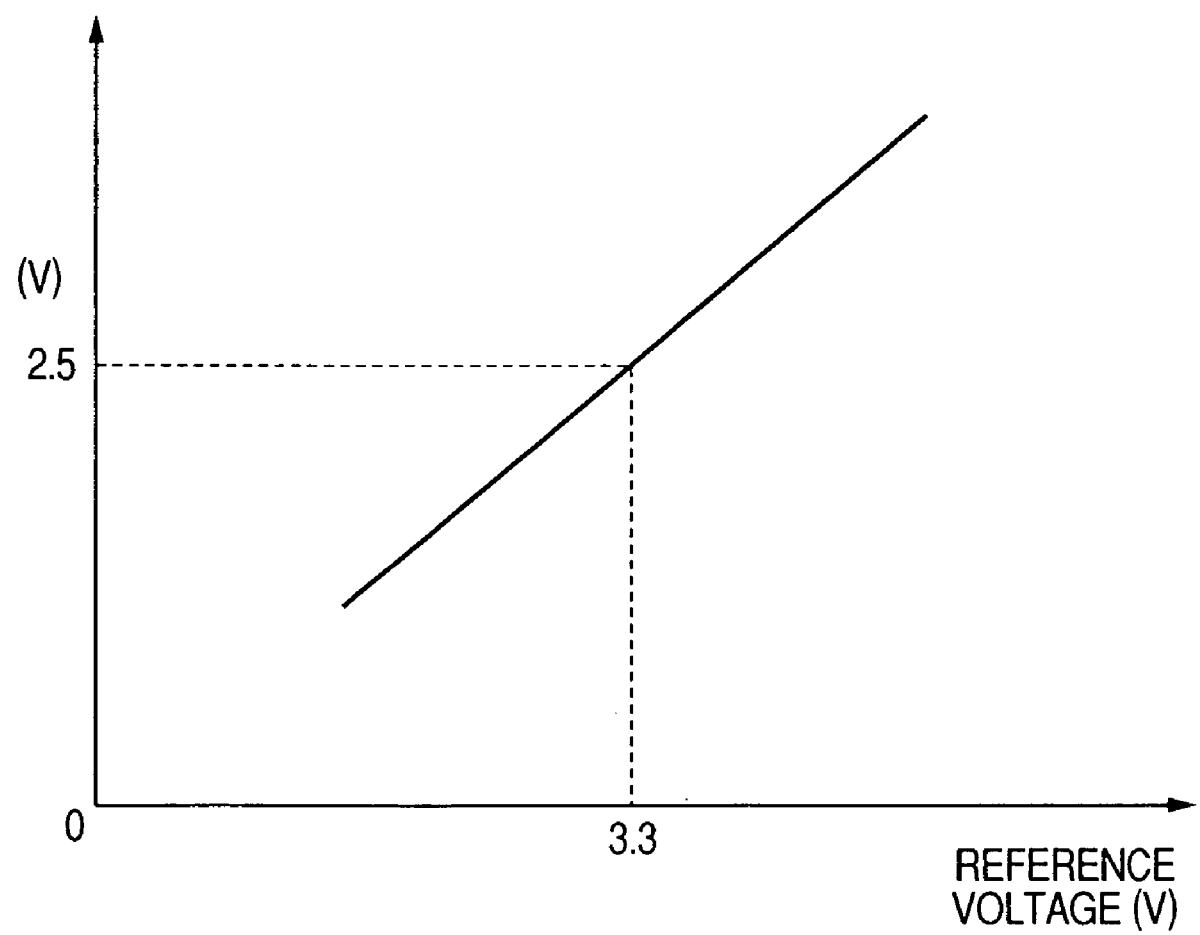
FIG. 10 is a graph showing a fluctuation of a reference voltage and a torque signal in accordance with the embodiment of the present invention.

The torque signal is determined by the reference voltage. Thus, if the torque signal also has fluctuated in accordance with the fluctuation of the reference voltage, it is considered that the torque sensor 4 is operated normally. For example, as shown in FIG. 10, if the detected reference voltage decreases at a ratio of 10% with respect to 3.3 V, in addition, if the neutral voltage of the torque signal decreases at a ratio of 10%, it is considered that the torque sensor 4 is operated normally. Further, a big problem is difficult to occur in fluctuation of the reference voltage within the threshold range even if the assist is continued. Further, the assist is desirably continued as long as possible in order that the steering is prevented from becoming heavy suddenly. Therefore, in such a case, the CPU 113 continues the assist while controlling the maximum value of the assist steering torque (step S912).

In addition, the maximum value of the assist steering torque may be limited in accordance with the fluctuation amount of the reference voltage. For example, when the reference voltage decreases at a ratio of 10%, the maximum value of the assist steering torque is made to decrease at a ratio of 10%, thereby being capable of avoiding misoperation in the vicinity of the maximum value of the torque signal.

After the CPU 113 performs the above processes, returns to the processes in the flow chart of FIG. 8. Then, the processes in the figure are repeatedly performed. Further, although not shown in the flow chart, the CPU 113 performs a predetermined fault return process if abnormalities occur in the torque signal and the reference voltage, and then, the signals return to normal values.

As described above, according to the power steering control device on this embodiment, monitoring not only the torque signal but also the reference voltage can detect the abnormality of the reference-voltage generator circuit. As a result, a fail safe function can be realized in accordance with abnormalities in the respective parts. For example, if the reference voltage is out of the predetermined threshold range, the generation of the steering assist torque can be prohibited. Further, if the reference voltage fluctuates in proportion to the torque neutral voltage of the torque sensor, it is considered that the torque sensor operates normally. Therefore, in this case, the CPU 113 gives a command which is to continue the generation of the steering assist torque to the calculator unit, and then, the generation of the steering assist torque can be continued.

Further, if the reference voltage has fluctuated, the upper limit of the steering assist torque is changed, thereby being capable of performing a more natural fail safe process. That is, if the reference voltage has fluctuated, it is considered that the voltage in the vicinity of the maximum value of the torque signal is inaccurate. In view of the above, the maximum value of the steering assist torque is changed in accordance with the fluctuation amount of the reference voltage, thereby being capable of avoiding misoperation of the power steering device in the vicinity of the maximum value of the torque signal. As just described, the reference voltage from the reference-voltage generator circuit as well as the torque signal is monitored, thereby being capable achieving a fine fail safe process in accordance with the state of the reference-voltage generator circuit.

Further, according to this embodiment, monitoring the reference voltage can adjust the torque neutral voltage of the sensor signal. That is, the torque neutral voltage is determined based on the reference voltage even if the reference voltage has fluctuated, the torque neutral voltage can be grasped with accuracy.

Hereinbefore, this embodiment has been described. However, the present invention is not limited to the above-described structure, and allows any changes in the range that does not depart from the gist of the present invention. For example, in the flow chart of FIG. 9, if the reference voltage has fluctuated the assist may be terminated without being limited. Further, the power steering control device according to this embodiment may be any of column type and rack type, and can be also applied to a hydraulic power steering device. Moreover, a program mode is not limited to the above flow charts, and can be changed as long as the same functions can be realized.

This application claims priority from Japanese Patent Application No. 2004-143231 filed on May 13, 2004, which is hereby incorporated by reference herein.

What is claimed is:

1. A power steering control device, comprising:
a torque sensor that detects a steering torque and outputs a torque signal having a torque neutral voltage determined based on a predetermined reference voltage;
a reference-voltage generator unit that generates the reference voltage;
an A/D converter unit that A/D converts the torque signal and the reference voltage;
a calculator unit that calculates a steering assist torque based on the A/D converted torque signal;
a current controller unit that supplies a driving current in accordance with the assist torque to a steering assist motor;
a fault diagnosis unit that monitors the A/D converted reference voltage and performs a predetermined fault diagnosis process; and
a neutral adjustor unit that adjusts the neutral voltage of the torque signal in accordance with fluctuation in the reference voltage.

2. A power steering control device according to claim 1, wherein the fault diagnosis unit gives a command to prohibit generation of the steering assist torque to the calculator unit when the reference voltage is out of a predetermined threshold range.

3. A power steering control device according to claim 1, wherein the fault diagnosis unit gives a command to continue generation of the steering assist torque to the calculator unit when the reference voltage fluctuates in proportion to the torque neutral voltage of the torque sensor.

4. A power steering control device according to claim 1, wherein the fault diagnosis unit gives a command to the calculator unit to change an upper limit value of the steering assist torque in accordance with a fluctuation amount of the reference voltage.

5. A power steering control method, comprising the steps of:
detecting a steering torque and outputting a torque signal having a torque neutral voltage determined based on a predetermined reference voltage by a torque sensor;
generating the reference voltage;
A/D converting the torque signal and the reference voltage;
calculating a steering assist torque based on the A/D converted torque signal;
supplying a driving current in accordance with the assist torque to a steering assist motor;
monitoring the A/D converted reference voltage and performing a predetermined fault diagnosis process; and
adjusting the neutral voltage of the torque signal in accordance with fluctuation in the reference voltage.

6. A power steering control method according to claim 5, wherein the step of performing a fault diagnosis includes prohibiting generation of the steering assist torque when the reference voltage is out of a predetermined threshold range.

7. A power steering control method according to claim 5, wherein the step of performing a fault diagnosis changes an upper limit value of the steering assist torque in accordance with a fluctuation amount of the reference voltage.

8. A power steering control method according to claim 5, wherein the step of performing a fault diagnosis includes continuing generation of the steering assist torque when the reference voltage fluctuates in proportion to the torque neutral voltage of the torque sensor.

9. A computer-readable/writable recording medium, which stores a power steering control program, the program comprising the steps of:
detecting a steering torque and outputting a torque signal having a torque neutral voltage determined based on a predetermined reference voltage by a torque sensor;
generating the reference voltage;
A/D converting the torque signal and the reference voltage;
calculating a steering assist torque based on the A/D converted torque signal;
supplying a driving current in accordance with the assist torque to a steering assist motor;

monitoring the A/D converted reference voltage and performing a predetermined fault diagnosis process; and adjusting the neutral voltage of the torque signal in accordance with change in the reference voltage.

10. A recording medium according to claim 9, wherein the step of performing a fault diagnosis includes prohibiting generation of the steering assist torque when the reference voltage is out of a predetermined threshold range.

11. A recording medium according to claim 9, wherein the step of performing a fault diagnosis includes continuing generation of the steering assist torque when the reference voltage fluctuates in proportion to the torque neutral voltage of the torque sensor.

12. A recording medium according to claim 9, wherein the step of performing a fault diagnosis includes changing an upper limit value of the steering assist torque in accordance with a fluctuation amount of the reference voltage.

* * * * *